United States Patent
Ito et al.

(10) Patent No.: US 10,865,462 B2
(45) Date of Patent: *Dec. 15, 2020

(54) PROCESSING METHOD FOR LITHIUM ION BATTERY SCRAP

(71) Applicant: JX NIPPON MINING & METALS CORPORATION, Tokyo (JP)

(72) Inventors: Junichi Ito, Tsuruga (JP); Junichi Arakawa, Tsuruga (JP); Takuya Yokota, Hitachi (JP); Naoki Higuchi, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 16/085,242

(22) PCT Filed: Mar. 15, 2017

(86) PCT No.: PCT/JP2017/010482
§ 371 (c)(1),
(2) Date: Sep. 14, 2018

(87) PCT Pub. No.: WO2017/159745
PCT Pub. Date: Sep. 21, 2017

(65) Prior Publication Data
US 2019/0106768 A1    Apr. 11, 2019

(30) Foreign Application Priority Data

Mar. 16, 2016    (JP) .................................. 2016-052801

(51) Int. Cl.
C22B 26/00    (2006.01)
C22B 26/12    (2006.01)
(Continued)

(52) U.S. Cl.
CPC ............ *C22B 26/12* (2013.01); *B09B 3/0016* (2013.01); *C22B 3/0005* (2013.01);
(Continued)

(58) Field of Classification Search
CPC .... C01G 45/003; C01G 51/003; C01G 51/04; C01G 53/003; C01G 53/04; C21B 15/00;
(Continued)

(56) References Cited

U.S. PATENT DOCUMENTS 6,261,712 B1 * 7/2001 Hayashi ................ H01M 10/54
423/179.5
6,835,228 B1 * 12/2004 Lin ........................ C22B 3/0005
205/583

(Continued)

FOREIGN PATENT DOCUMENTS

CN    1601805 A    3/2005
CN    102534223 A    7/2012
(Continued)

OTHER PUBLICATIONS

Notification of Transmittal of Translation of the IPRP; International Preliminary Report on Patentability and English translation of Written Opinion of the International Searching Authority, dated Sep. 27, 2018 for PCT/JP2017/010482 (Forms PCT/IB/338, PCT/IB/373 and PCT/ISA/237).

(Continued)

*Primary Examiner* — Steven J Bos
(74) *Attorney, Agent, or Firm* — Birch, Stewart, Kolasch & Birch, LLP

(57) ABSTRACT

A method for processing lithium ion battery scrap includes a leaching step of leaching lithium ion battery scrap and subjecting the resulting leached solution to solid-liquid separation to obtain a first separated solution; an iron removal step of adding an oxidizing agent to the first (Continued)

separated solution and adjusting a pH of the first separated solution in a range of from 3.0 to 4.0, then performing solid-liquid separation and removing iron in the first separated solution to obtain a second separated solution; and an aluminum removal step of neutralizing the second separated solution to a pH range of from 4.0 to 6.0, then performing solid-liquid separation and removing aluminum in the second separated solution to obtain a third separated solution.

9 Claims, 2 Drawing Sheets

(51) Int. Cl.
| | |
|---|---|
| H01M 10/54 | (2006.01) |
| C22B 23/00 | (2006.01) |
| C22B 15/00 | (2006.01) |
| C22B 3/00 | (2006.01) |
| C22B 3/26 | (2006.01) |
| C22B 3/30 | (2006.01) |
| B09B 3/00 | (2006.01) |
| C22B 3/44 | (2006.01) |
| C22B 3/38 | (2006.01) |
| C22B 7/00 | (2006.01) |
| C22B 3/08 | (2006.01) |

(52) U.S. Cl.
CPC .......... *C22B 3/0017* (2013.01); *C22B 3/0043* (2013.01); *C22B 3/08* (2013.01); *C22B 3/44* (2013.01); *C22B 7/00* (2013.01); *C22B 7/007* (2013.01); *C22B 15/00* (2013.01); *C22B 23/00* (2013.01); *C22B 23/0407* (2013.01); *H01M 10/54* (2013.01); *Y02P 10/234* (2015.11); *Y02W 30/84* (2015.05)

(58) Field of Classification Search
CPC ... C22B 3/0005; C22B 3/0017; C22B 3/0043; C22B 3/44; C22B 7/007; C22B 23/0407; C22B 23/043; C22B 23/0461; C22B 26/12; H01M 10/54; B09B 3/0016
USPC ..... 423/139, 24, 49, 150.3, 131, 132, 179.5, 423/27, 41, 112; 429/49
See application file for complete search history.

(56) References Cited

U.S. PATENT DOCUMENTS

| | | | | |
|---|---|---|---|---|
| 2011/0059339 | A1* | 3/2011 | Yamasaki | C22B 3/165 |
| | | | | 429/49 |
| 2011/0135547 | A1 | 6/2011 | Kobayashi et al. | |
| 2013/0192425 | A1* | 8/2013 | Sonu | C22B 3/0068 |
| | | | | 75/743 |
| 2013/0269484 | A1* | 10/2013 | Ishida | C22B 7/007 |
| | | | | 75/743 |
| 2014/0227153 | A1* | 8/2014 | Laucournet | C22B 7/006 |
| | | | | 423/141 |

FOREIGN PATENT DOCUMENTS

| | | | |
|---|---|---|---|
| EP | 2450991 | A1 | 5/2012 |
| JP | 2010-180439 | A | 8/2010 |
| JP | 2012-001750 | A | 1/2012 |
| JP | 2013-181247 | A | 9/2013 |
| JP | 2014-162982 | A | 9/2014 |
| JP | 5706457 | B2 | 4/2015 |
| WO | WO 2011/065682 | A2 | 6/2011 |

OTHER PUBLICATIONS

Extended European Search Report for corresponding European Application No. 17766741.7, dated Oct. 22, 2019.
International Search Report (PCT/ISA/210) issued in PCT/JP2017/010482, dated Apr. 18, 2017.
Chinese Office Action dated Apr. 1, 2020, issued in Chinese Patent Application No. 201780017652.8, with English translation.
Jiejiang, "Nickel Electrolytic Smelting Machine," Chinese: Karyo Electrolysis Smelting Machine, Metallurgical Industry Publishing Co., Jan. 2016, pp. 152-156.
Supplemental Notice of Allowance dated Jul. 15, 2020 for U.S. Appl. No. 16/085,337.
Notice of Allowance dated Jun. 17, 2020 for U.S. Appl. No. 16/085,337.
Extended European Search Report for European Application No. 17766739.1, dated Oct. 23, 2019.
International Search Report, issued in PCT/JP2017/010480, dated Apr. 18, 2017.
Non-Final Office Action dated Mar. 6, 2020 for U.S. Appl. No. 16/085,337.
Notification of Transmittal of Translation of the International Preliminary Report on Patentability; International Preliminary Report on Patentability and English Translation of Written Opinion of the International Searching Authority, dated Sep. 27, 2018, issued in PCT/JP2017/010480 (Forms PCT/IB/338; PCT/IB/373 and PCT/ISA/237).
Supplemental Notice of Allowability dated Aug. 5, 2020 for U.S. Appl. No. 16/085,337.

* cited by examiner

[FIG. 1]
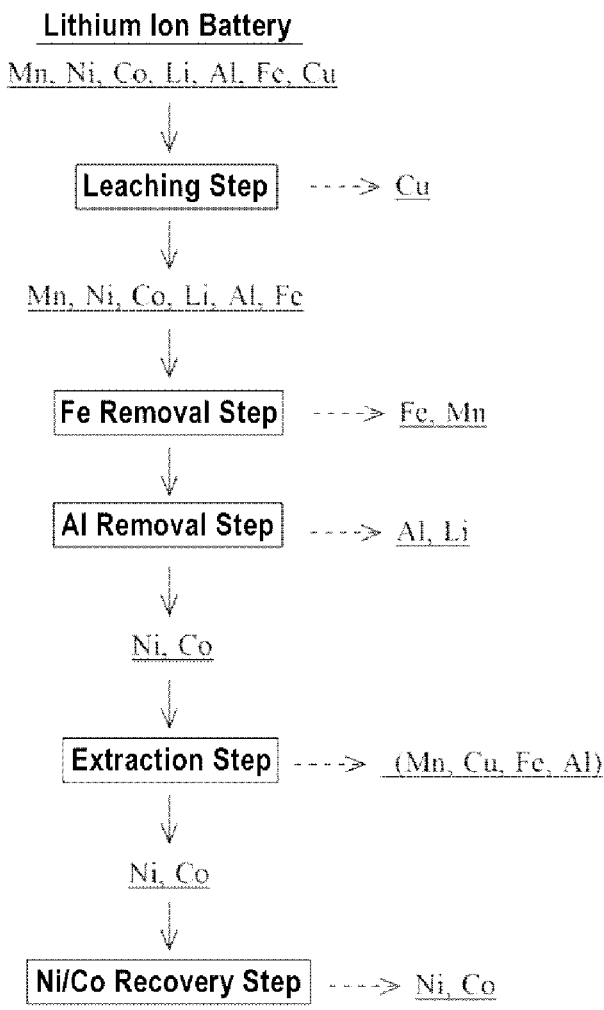

[FIG. 2]
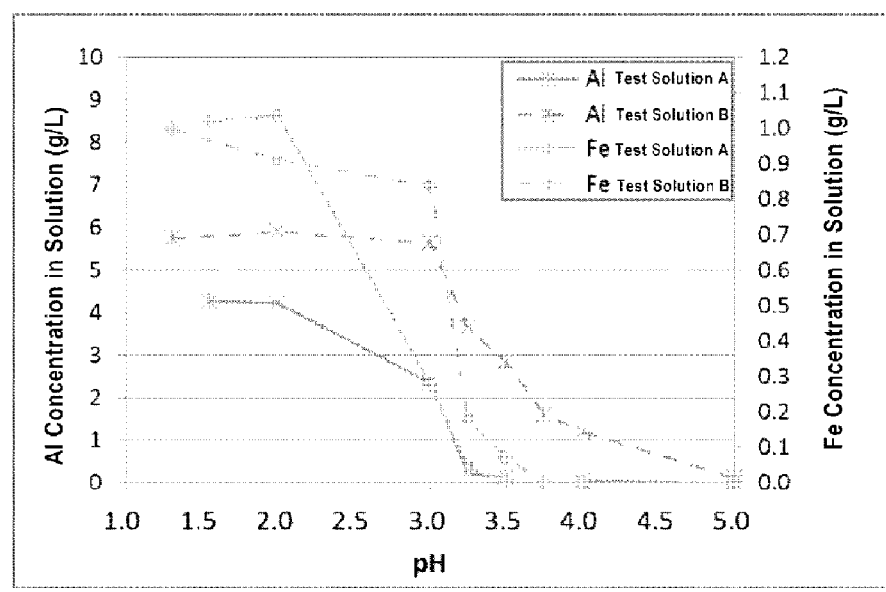

PROCESSING METHOD FOR LITHIUM ION BATTERY SCRAP

TECHNICAL FIELD

The present invention relates to a method for processing lithium ion battery scrap. More particularly, the present invention proposes a technique that can be effectively used for recovering valuable metals from various lithium ion battery scrap.

BACKGROUND ART

Lithium ion batteries used in various industrial fields including various electronic devices employ lithium metal salts containing manganese, nickel and cobalt as positive electrode active materials. Recently, with an increased amount of lithium ion batteries to be used and expansion of the range of use, an amount of the lithium ion batteries to be discarded has been increased due to product life of the batteries and defects in the manufacturing processes.

Under such circumstances, there is a need for easily recovering expensive elements such as nickel and cobalt as stated above from a large amount of lithium ion battery scrap discarded, with a relatively low cost in order to reuse the elements.

In order to process the lithium ion battery scrap for recovering the valuable metals, the lithium ion battery scrap in the form of powder or particle obtained through each step such as roasting, crushing and sieving as required are firstly acid-leached using hydrogen peroxide water and lithium, nickel, cobalt, manganese, iron, copper, aluminum or the like that can be contained therein are dissolved in the solution to obtain a leached solution.

The leached solution is then subjected to a solvent extraction method to sequentially separate respective metal elements. In this case, the leached solution is sequentially subjected to a plurality of stages of solvent extraction or neutralization depending on the metals to be separated and each solution obtained in each stage is subjected to stripping, electrolysis, carbonization or other treatments, in order to separate each metal leached in the leached solution. More particularly, each valuable metal can be recovered by firstly recovering iron and aluminum, subsequently recovering manganese and copper, then cobalt, and then nickel, and finally leaving lithium in the aqueous phase.

For such prior arts, Patent Document 1 discloses a method for recovering nickel from an aqueous sulfuric acid solution containing nickel and cobalt, and impurity elements such as iron, aluminum and manganese, the method comprising: removing iron and aluminum from the aqueous sulfuric acid solution by an oxidation neutralization treatment, then separating and recovering a mixed hydroxide containing nickel and cobalt by a neutralization treatment, and then obtaining reverse extraction solutions each containing cobalt and nickel by a solvent extraction treatment from a concentrate obtained by dissolving the mixed hydroxide.

Further, Patent Document 2 discloses that an aqueous metal mixed solution containing a metal group A comprising of lithium, manganese, nickel and cobalt; and a metal group B consisting of copper, aluminum and iron are sequentially subjected to solvent extraction processes under certain conditions to recover each metal.

CITATION LIST

Patent Literatures

Patent Document 1: Japanese Patent Application Publication No. 2010-180439 A

Patent Document 2: Japanese Patent No. 5706457 B

SUMMARY OF INVENTION

Technical Problem

For example, when processing lithium ion battery scrap or the like in discarded consumer appliances, a leached solution obtained by leaching the lithium ion battery scrap may contain relatively large amounts of the positive electrode active materials contained in the positive electrode materials, iron and copper contained in negative electrode materials, as well as aluminum contained in aluminum foils deposited to the positive electrode materials or contained in housings or the like of the lithium ion batteries.

If lager amounts of iron and aluminum are contained in the leached solution, an increased number of stages of solvent extraction or an operation for diluting a pre-extraction solution or the like will be required in order to reliably remove the larger amounts of iron and aluminum, so that processing capacity will be decreased. Therefore, it is not desirable to use the conventional treatment method as it is for scrap of lithium ion batteries for consumer appliances or the like, which will result in a leached solution containing larger amounts of iron and aluminum.

An object of the present invention is to solve such problems suffering from the prior arts, and to provide a method for processing lithium ion battery scrap, which can effectively remove iron and aluminum from a leached solution obtained by leaching the lithium ion battery scrap, even if the leached solution contains relatively large amounts of iron and aluminum.

Solution to Problem

The present inventors have found that after leaching the lithium ion battery scrap and before recovering valuable metals contained in the lithium ion battery scrap from the leached solution, each of iron and aluminum in the leached solution is oxidized and neutralized under predetermined conditions, whereby the iron and aluminum can be effectively removed while suppressing recovery loss of valuable metals.

Based on such findings, the present invention provides a method for processing lithium ion battery scrap, the method comprising: a leaching step of leaching lithium ion battery scrap and subjecting the resulting leached solution to solid-liquid separation to obtain a first separated solution; an iron removal step of adding an oxidizing agent to the first separated solution and adjusting a pH of the first separated solution in a range of from 3.0 to 4.0, then performing solid-liquid separation and removing iron in the first separated solution to obtain a second separated solution; and an aluminum removal step of neutralizing the second separated solution to a pH range of from 4.0 to 6.0, then performing solid-liquid separation and removing aluminum in the second separated solution to obtain a third separated solution.

It is preferable that in the method for processing the lithium ion battery scrap according to the present invention, when the lithium ion battery scrap contains copper, the leaching step comprises leaving copper contained in the lithium ion battery scrap as a solid and removing the copper by the solid-liquid separation.

It is preferable that in the method for processing the lithium ion battery scrap according to the present invention, the oxidizing agent added to the first separated solution in the iron removal step comprises one or more selected from the group consisting of manganese dioxide, positive electrode active materials, and manganese-containing leached residues obtained by leaching the positive electrode active materials.

It is preferable that in the method for processing the lithium ion battery scrap according to the present invention, the first separated solution contains lithium dissolved in the first separated solution, and the first separated solution has a molar ratio (Li/Al ratio) of lithium to aluminum in the first separated solution of 1.1 or more.

Further, in the aluminum removal step, the second separated solution preferably has a temperature of from 60° C. to 90° C.

When the third separated solution contains dissolved manganese, copper, iron and/or aluminum, the method for processing the lithium ion battery scrap further comprises an extraction step of subjecting the third separated solution to solvent extraction to remove manganese, copper, iron and/or aluminum from the third separated solution.

In particular, it is preferable that the extraction step comprises subjecting the third separated solution to solvent extraction using a mixed extracting agent containing a phosphate ester-based extracting agent and an oxime-based extracting agent.

It is more preferable that the method for processing the lithium ion battery scrap according to the present invention further comprises a cobalt/nickel recovery step of recovering cobalt and/or nickel from an extraction residual solution after the extraction step.

It is more preferable that the method further comprises a lithium recovery step of recovering lithium after the cobalt/nickel recovery step.

Advantageous Effects of Invention

According to the method for processing the lithium ion battery scrap of the present invention, even if relatively large amounts of iron and aluminum are contained in the leached solution obtained by leaching the lithium ion battery scrap, iron and aluminum in the leached solution can be effectively removed prior to recovery of valuable metals from the leached solution.

BRIEF DESCRIPTION OF DRAWINGS

FIG. 1 is a flowchart showing a method for processing lithium ion battery scrap according to one embodiment of the present invention.

FIG. 2 is a graph showing changes in aluminum concentration and iron concentration in a solution with pH increase in an iron removal step and an aluminum removal step in Examples.

DESCRIPTION OF THE PREFERRED EMBODIMENTS

Embodiments of the present invention will be described in detail below.

As illustrated in FIG. 1, a method for processing lithium ion battery scrap according to the present invention includes: a leaching step of leaching lithium ion battery scrap and subjecting the resulting leached solution to solid-liquid separation to obtain a first separated solution; an iron removal step of adding an oxidizing agent to the first separated solution and adjusting a pH of the first separated solution in a range of from 3.0 to 4.0, then performing solid-liquid separation and removing iron in the first separated solution to obtain a second separated solution; and an aluminum removal step of neutralizing the second separated solution to a pH range of from 4.0 to 6.0, then performing solid-liquid separation and removing aluminum in the second separated solution to obtain a third separated solution.

(Lithium Ion Battery)

The lithium ion battery for use in the present invention may be any lithium ion battery that can be used in various electronic devices such as mobile phones. Among them, so-called lithium ion battery scrap discarded due to lapses of lifetimes of battery products, manufacturing defects or other reasons is preferably used in terms of effective utilization of resources.

The lithium ion battery scrap that can be used may include so-called battery refuse, a mixture of the battery refuse and positive electrode materials with aluminum foils or positive electrode active materials, and materials obtained by roasting, chemically treating, crashing and/or sieving the battery refuse as required, and so on.

The battery refuse may include, in addition to the positive electrode active materials which are lithium metal salts containing manganese, nickel and cobalt, negative electrode materials containing carbon, iron and copper, and aluminum foils deposited to the positive electrode active materials, and aluminum housings of the lithium ion batteries. More particularly, the lithium ion battery may contain a single metal oxide composed of one element of lithium, nickel, cobalt and manganese forming the positive electrode active material, and/or a composite metal oxide composed of two or more elements, as well as aluminum, copper, iron, carbon and the like.

In the present invention it is particularly effective to use lithium ion battery scrap containing from 0.5% by mass to 5% by mass of iron; and from 0.5% by mass to 10% by mass of aluminum, because the lithium ion battery scrap containing relatively large amounts of iron and aluminum cannot be effectively processed by the conventional method.

(Leaching Step)

In the leaching step, for example, the above lithium ion battery scrap obtained through crashing/sieving is added to a leaching solution such as a sulfuric acid solution to leach the scrap. A leached solution thus obtained is subjected to solid-liquid separation using a known apparatus and method such as a filter press or thickener to obtain a first separated solution from which solids contained in the leached solution are removed.

Here, copper contained in the lithium ion battery scrap is preferably left as a solid while maintaining a low leaching rate, until the end of leaching. This can be achieved by allowing an aluminum solid to be present in the leached solution, such as by being originally contained in the lithium ion battery scrap and/or by being separately added to the leached solution. While not wishing to be bound by any theory, the reason would be that aluminum is a less-noble metal than copper, i.e., aluminum has a lower standard oxidation reduction potential than copper, so that a dissolution reaction of aluminum proceeds earlier than that of copper contained in the lithium ion battery scrap, and copper which has been already dissolved in the acidic solution is precipitated.

This can lead to effective removal of copper left as a solid when carrying out solid-liquid separation for the leached solution.

Although the aluminum solid as described above may be present in the acidic solution throughout the period from the initiation to the end of the leaching step, the aluminum solid may present in the acidic solution at least in a certain period of time during the leaching step. While the aluminum solid is present, the dissolution of copper will be suppressed.

In this case, only the lithium ion battery scrap containing aluminum powder may be added to the acidic solution as the aluminum powder originally contained in the lithium ion battery scrap for the aluminum solid to be present in the acidic solution. However, in addition to the lithium ion battery scrap, an aluminum solid may also be separately added to the acidic solution.

When the aluminum solid different from the lithium ion battery scrap is added to the acidic solution, the aluminum solid may be preferably aluminum powder obtained by processing other lithium ion battery scrap. This is because when recovering valuable metals such as nickel and cobalt from discarded lithium ion battery scrap and the like, the positive electrode active material containing the valuable metals may be peeled off from the aluminum foil to which the positive electrode active material for the positive electrode material adheres, and a large amount of aluminum powder may generated during the peeling processing, so that it is desirable to effectively utilize such aluminum powder.

Then, once the aluminum solid is completely dissolved, the dissolution of copper then begins. Therefore, it is advantageous that the leaching step is terminated before the aluminum solid in the acidic solution completely dissolves and copper contained in the lithium ion battery scrap starts to dissolve, in terms of being able to more effectively suppress the dissolution of copper. For example, the leaching step can be terminated before the leaching rate of cobalt or nickel sufficiently increases and the leaching rate of copper increases.

In the leaching step, the pH of the leaching solution may be from 0 to 2.0. If the pH is too high, then sufficient leaching velocities of cobalt and nickel may not be achieved. On the other hand, if the pH is too low, the leaching will rapidly proceed, copper will be leached out, and costs may be increased due to pH adjustment if there is a need for increasing the pH in the subsequent step.

In the leaching step, the leaching time from the time when the lithium ion battery scrap is added to the acidic solution to the end of the leaching may be from 0.5 hours to 10 hours. If the reaction time is too short, cobalt or nickel desired to be dissolved may not be sufficiently dissolved. On the other hand, if the leaching time is too long, the dissolution of the aluminum solid may be terminated and the dissolution of copper may begin. A more preferable range of the leaching time may be from 1 hour to 5 hours, and more preferably from 1 hour to 3 hours.

The solid-liquid separation in the leaching step also removes solid aluminum that remains without being dissolved and carbon that may be contained in the lithium ion battery scrap, so that those substances that may act as reducing agents can eliminated any possibility of adversely affecting an iron removal step that will be described below. Further, by performing the solid-liquid separation before the iron removal step, copper that can be dissolved by the oxidizing agent added in the iron removal step can be removed in advance, so that dissolution of copper in the iron removal step can be prevented and the number of steps required for removing the dissolved copper can be reduced.

(Iron Removal Step)

In the iron removal step, an oxidizing agent is added to the first separated solution obtained in the leaching step, and a pH of the first separated solution is adjusted to a pH range of from 3.0 to 4.0 to precipitate iron in the first separated solution, and the iron is then removed by subsequent solid-liquid separation to obtain a second separated solution.

In the iron removal step, iron in the first separated solution is oxidized from divalent iron to trivalent iron by adding the oxidizing agent to the first separated solution, and the trivalent iron is precipitated as an oxide (hydroxide) at a lower pH than the divalent iron. Therefore, iron can be precipitated by adjusting the first separated solution to the relatively low pH as described above. In many cases, iron is precipitated as a solid such as iron hydroxide ($Fe(OH)_3$).

If the pH is greatly increased, precipitation of cobalt will occur, but in the iron removal step, iron can be precipitated without increasing the pH so much, so that precipitation of cobalt at this time can be effectively suppressed.

In the iron removal step, if the pH is too low, iron cannot be sufficiently precipitated, whereas if the pH is too high, other metals such as cobalt will also be precipitated. From this viewpoint, the pH of the first separated solution in the iron removal step is preferably from 3.0 to 4.0.

Further, in the iron removal step, the first separated solution has an oxidation-reduction potential (ORP vs AgCl), i.e., an ORP value, of from 500 mV to 1400 mV, and more preferably from 700 mV to 1200 mV. If the ORP value at this time is too high, cobalt may be oxidized and precipitated as an oxide. On the other hand, if the ORP value is too low, iron may not be oxidized.

The oxidizing agent added to the first separated solution in the iron removal step is not particularly limited as long as it can oxidize iron. Preferable oxidizing agent includes manganese dioxide, positive electrode active materials and/or manganese-containing leached residues obtained by leaching the positive electrode active materials. These materials can effectively oxidize iron in the first separated solution. It should be noted that manganese dioxide may be contained in the manganese-containing leached residues obtained by leaching the positive electrode active materials with an acid or the like.

It also should be noted that when using the above positive electrode active material as the oxidizing agent, a precipitation reaction occurs in which manganese dissolved in the first separated solution is converted to manganese dioxide. Therefore, the precipitated manganese can be removed together with iron.

Further, in the iron removal step, for example, an alkali such as sodium hydroxide, sodium carbonate and ammonia can be added to the first separated solution to adjust the pH to the above range.

(Aluminum Removal Step)

In the aluminum removal step, aluminum in the second separated solution obtained in the above iron removal step is precipitated by increasing the pH of the second separated solution to a pH range of from 4.0 to 6.0 to neutralize the second separated solution, and removing the aluminum by subsequent solid-liquid separation to obtain a third separated solution.

In the aluminum removal step, if the pH is too low, aluminum cannot be sufficiently precipitated, whereas if the pH is too high, other metals such as cobalt will also be precipitated. From this viewpoint, the pH of the second separated solution in the aluminum removal step is more preferably from 4.0 to 6.0, and even more preferably from 4.5 to 5.0.

In the aluminum removal step, for example, an alkali such as sodium hydroxide, sodium carbonate and ammonia can be added to the second separated solution in order to increase the pH to the above range.

Further, in the aluminum removal step, the second separated solution may preferably have a temperature of from 60° C. to 90° C. If the temperature of the second separated solution is less than 60° C., reactivity may be deteriorated, and if it is higher than 90° C., a device that can withstand the elevated temperature will be required, as well as it is not preferable in terms of safety. Therefore, the temperature of the second separated solution is preferably from 60° C. to 90° C.

Here, the first separated solution obtained in the leaching solution as described above contains lithium dissolved therein, and may preferably have a molar ratio of lithium to aluminum in the first separated solution (Li/Al ratio) of 1.1 or more, in terms of improvement of filterability of the precipitate in the aluminum removal step. In this case, the aluminum contained in the precipitate in the aluminum removal step will produce composite oxides or composite hydroxides, such as gelatinous $Al(OH)_3$ as well as crystalline $LiAlO_2$ and $LiAl_2(OH)_7$, and will bring about a form close to a powder form. Since the precipitate is easily filtered during the solid-liquid separation, a time required for filtration during the solid-liquid separation in the aluminum removal step can be shortened.

From this viewpoint, the molar ratio (Li/Al ratio) of lithium to aluminum in the first separated solution is preferably 1.1 or more.

Lithium in the first separated solution may be one in which lithium originally contained in the lithium ion battery scrap has been acid-leached, as well as one in which other lithium-containing materials have been added to the leached solution or the first separated solution and acid-leached. Further, the Al/Li ratio in the first separated solution can also be adjusted by adding the lithium-containing materials. For the lithium-containing materials, reagents may be used. However, the lithium-containing materials that can be preferably used include lithium compounds such as lithium carbonate and lithium hydroxide obtained in the processing of lithium ion battery scrap, and aqueous lithium solutions obtained by dissolving at least one of these compounds in water.

(Extraction Step)

For the reason that manganese is contained in the lithium ion battery scrap, and the like, the manganese may be contained in the third separated solution obtained in the aluminum removal step, or copper, iron and aluminum left without being completely removed in the leaching step, the iron removal step and the aluminum removal step as stated above may be contained in the third separated solution. In this case, the third separated solution may be subjected to an extraction step of extracting manganese or the like. However, when manganese or the like is not contained in the third separated solution, the extraction step may be omitted.

Specifically, in the extraction step, the third separated solution can be subjected to solvent extraction using a mixed extracting agent containing a phosphate ester-based extracting agent and an oxime-based extracting agent to separate manganese, copper, iron and/or aluminum.

In particular, the use of the phosphate ester-based extracting agent in combination with the oxime-based extracting agent can significantly improve a separation efficiency of copper, iron and/or aluminum. Among them, most of copper can be extracted.

(Cobalt/Nickel Recovery Step)

After the manganese extraction step, cobalt and/or nickel in the extraction residual solution are recovered. The recovery processes of cobalt and/or nickel can be carried out by known methods, respectively. More particularly, cobalt and nickel can be sequentially subjected to solvent extraction processes, respectively, and cobalt in the solvent can be transferred back to the aqueous phase by stripping and recovered by electrowinning, and nickel in the solvent can also be recovered by stripping and electrowinning.

(Lithium Recovery Step)

When lithium remains after the cobalt/nickel recovery step, lithium in the aqueous phase can be, for example, carbonated and recovered as lithium carbonate.

EXAMPLES

The present invention was experimentally conducted and its effects were confirmed as described below. However, the description herein is merely for the purpose of illustration and is not intended to be limited thereto.

Examples

Test solution A and test solution B having the compositions as shown in Table 1 were prepared, respectively, and were sequentially subjected to the iron removal step and the aluminum removal step under the following conditions, respectively, to confirm decreases in iron and aluminum concentrations, and a loss rate of cobalt To prepare the test solution A and the test solution B, 1.5-fold molar equivalent of sulfuric acid relative to manganese, nickel and cobalt and 0.5-ford molar equivalent of hydrogen peroxide relative to manganese, nickel and cobalt were used. The test solution A and test solution B were subjected to the test under the same conditions except for their compositions.

TABLE 1

| Component, g/L | Co | Fe | Al | Li |
| --- | --- | --- | --- | --- |
| Test Solution A | 30 | 0.5 | 4.0 | 2.0 |
| Test Solution B | 30 | 1.2 | 6.1 | 4.1 |

In the iron removal step, a positive electrode material was added as an oxidizing agent such that a pulp concentration was 8.7 g/L, and sodium hydroxide was also added to adjust the pH to 3.25, and solid-liquid separation (filtration 1) was then carried out. An oxidation time herein was 2 hours.

In the aluminum removal step, neutralization was carried out by adding sodium hydroxide to adjust the pH to 5.0, and solid-liquid separation (filtration 2) was then carried out. A temperature of each solution herein was 70° C.

FIG. 2 shows a graph illustrating changes in the aluminum concentration and the iron concentration in the solution with an increase in the pH in the iron removal step and the aluminum removal step, for each of the test solution A and the test solution B. Further, Table 2 shows a loss rate of cobalt in each of the filtrations 1 and 2.

TABLE 2

| | Loss Rate (%) of Co | | |
|---|---|---|---|
| | Filtration 1 (pH 3.25) | Filtration 2 (pH 5.0) | Total |
| Test Solution A | 1.8 | 1.0 | 2.8 |
| Test Solution B | 2.0 | 4.6 | 6.6 |

As can be seen from FIG. 2, iron and aluminum were sufficiently removed in each step for both the test solution A and the test solution B. As the concentration in each solution after the iron removal step and the aluminum removal step, the aluminum concentration was 31 mg/L and the iron concentration was <1 mg/L in the test solution A, and the aluminum concentration was 116 mg/L and the iron concentration was <1 mg/L in the test solution B.

Further, the test solution A had a molar ratio of lithium to aluminum (Li/Al ratio) of 2.0, and the test solution B had a Li/Al ratio of 2.6. Therefore, the filterability in the filtration 2 was good for both of the test solutions A and B.

The solution obtained after the aluminum removal step and the iron removal step as stated above was subjected to solvent extraction using a mixed extracting agent containing a phosphate ester-based extracting agent and an oxime-based extracting agent. As a result, for both the test solution A and the test solution B, the aluminum concentration was <1 mg/L, and the iron concentration was <1 mg/L, demonstrating that aluminum and iron could be completely removed.

Comparative Example

The test solutions A and B as described above were subjected to solvent extraction using the mixed extracting agent containing the phosphate ester-based extracting agent and the oxime-based extracting agent without carrying out the iron removal step and the aluminum removal step. As the concentration in the solution after the solvent extraction, the aluminum concentration was 2421 mg/L and the iron concentration was 156 mg/L for the test solution A, and the aluminum concentration was 3789 mg/L and the iron concentration was 220 mg/L for the test solution B. Aluminum and iron could not be completely removed for both of the test solutions A and B.

What is claimed is:

1. A method for processing lithium ion battery scrap, the method comprising:
    a leaching step of leaching lithium ion battery scrap and subjecting the resulting leached solution to solid-liquid separation to obtain a first separated solution;
    an iron removal step of adding an oxidizing agent to the first separated solution and adjusting a pH of the first separated solution in a range of from 3.0 to 4.0, then performing solid-liquid separation and removing iron in the first separated solution to obtain a second separated solution; and
    an aluminum removal step of neutralizing the second separated solution to a pH range of from 4.0 to 6.0, then performing solid-liquid separation and removing aluminum in the second separated solution to obtain a third separated solution.

2. The method for processing the lithium ion battery scrap according to claim 1,
    wherein the lithium ion battery scrap contains copper; and
    wherein the leaching step comprises leaving copper contained in the lithium ion battery scrap as a solid and removing the copper by the solid-liquid separation.

3. The method for processing the lithium ion battery scrap according to claim 1, wherein the oxidizing agent added to the first separated solution in the iron removal step comprises one or more selected from the group consisting of manganese dioxide, positive electrode active materials, and manganese-containing leached residues obtained by leaching the positive electrode active materials.

4. The method for processing the lithium ion battery scrap according to claim 1,
    wherein the first separated solution contains lithium dissolved in the first separated solution; and
    wherein the first separated solution has a molar ratio of lithium to aluminum in the first separated solution (Li/Al ratio) of 1.1 or more.

5. The method for processing the lithium ion battery scrap according to claim 1, wherein in the aluminum removal step, the second separated solution has a temperature of from 60° C. to 90° C.

6. The method for processing the lithium ion battery scrap according to claim 1,
    wherein the third separated solution contains dissolved manganese, copper, iron and/or aluminum,
    wherein the method further comprises an extraction step of subjecting the third separated solution to solvent extraction to remove manganese, copper, iron and/or aluminum from the third separated solution.

7. The method for processing the lithium ion battery scrap according to claim 6, wherein the extraction step comprises subjecting the third separated solution to solvent extraction using a mixed extracting agent containing a phosphate ester-based extracting agent and an oxime-based extracting agent.

8. The method for processing the lithium ion battery scrap according to claim 6, further comprising a cobalt/nickel recovery step of recovering cobalt and/or nickel from an extraction residual solution after the extraction step.

9. The method for processing the lithium ion battery scrap according to claim 8, further comprising a lithium recovery step of recovering lithium after the cobalt/nickel recovery step.

* * * * *